M. MALKIEL.
INCANDESCENT PETROLEUM LAMP.
APPLICATION FILED FEB. 3, 1908.
945,791.
Patented Jan. 11, 1910.
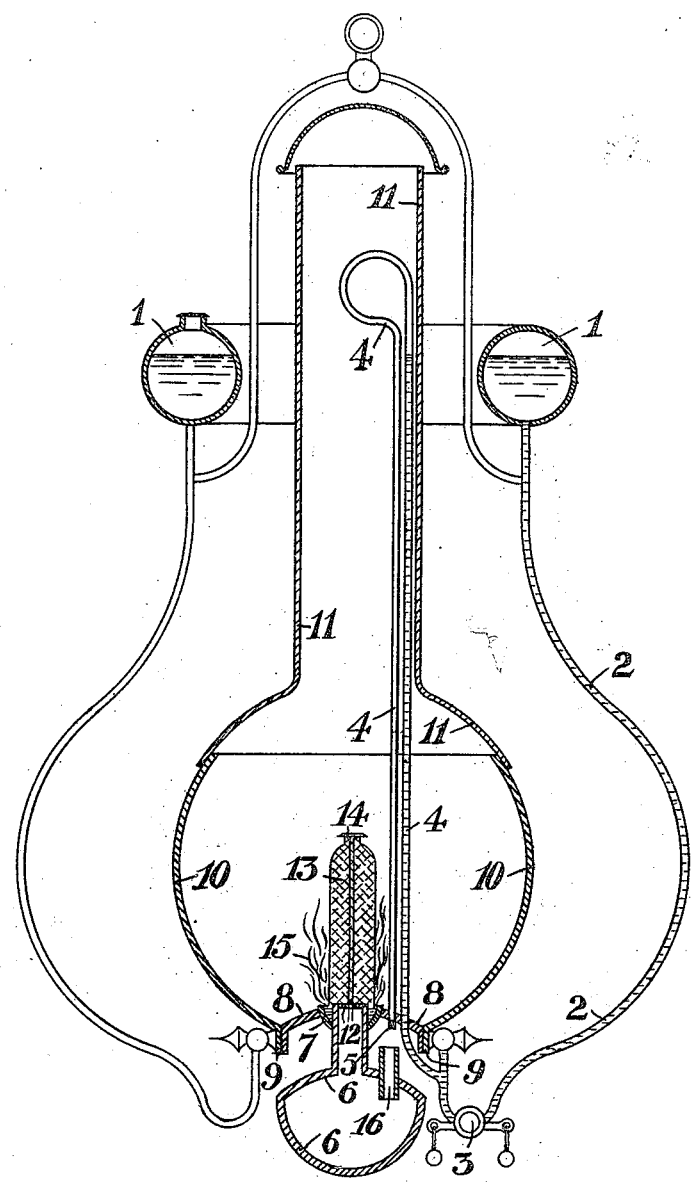

UNITED STATES PATENT OFFICE.

MATTHIAS MALKIEL, OF ST. PETERSBURG, RUSSIA.

INCANDESCENT PETROLEUM-LAMP.

945,791.   Specification of Letters Patent.   Patented Jan. 11, 1910.

Application filed February 3, 1908. Serial No. 414,081.

*To all whom it may concern:*

Be it known that I, MATTHIAS MALKIEL, a subject of the Czar of Russia, residing at St. Petersburg, in the Empire of Russia, have invented certain new and useful Improvements in Incandescent Petroleum-Lamps, of which the following is a full, clear, and exact description.

This invention relates to an incandescent petroleum lamp acting by gravitation, and having a vaporizer rising above the level of the petroleum in the reservoir, and curved downward and ending in a nozzle, beneath a partition which closes the globe and opposite the mixing-funnel.

In the accompanying drawing a lamp in accordance with this invention is shown in vertical section.

1 is the petroleum container or reservoir, 2 a supply-pipe through which the petroleum flows by gravitation from the petroleum container to the vaporizer 4. As already stated the vaporizer 4 rises above the level of the petroleum in the reservoir and is curved downward so as to end beneath the partition 8, in a nozzle 5. The partition 8 which closes the globe may be of any suitable form—concave, convex, or horizontal; it is made of metal or glass, and serves for separating the space above the nozzle 5 from that beneath it. A glass-globe 10 is fitted hermetically to the upper side of the partition 8, and is tightly connected with the chimney or draft-pipe 11. A mixing chamber 6 is fitted to the underside of the partition 8. The mixing-chamber 6 connects with the glass-globe and is provided at its upper end with a metallic network 12, while an incandescent mantle 13 is mounted on a rod 14 above it.

7 is a cup into which spirit is poured for lighting the lamp.

16 is a pipe through which air may enter the mixing chamber 6.

The working of this improved lamp is as follows:—After the spirit in the cup 7 has been ignited, the petroleum in the vaporizer, which when the tap 3 is turned on, reaches the same level as the petroleum in the container, begins gradually to be vaporized and to pass in a gaseous form through a small hole in the nozzle 5, into the mixing-funnel 16 and into the mixing-chamber 6. At the same time, air is drawn into the mixing-chamber by the action of the chimney or draft-pipe 11, so that a mixture of gas and air suitable for a Bunsen burner is formed in the said chamber. The Bunsen mixture passes through the metallic network 12, and, coming in contact with the flame of the spirit burning in the cup 7, ignites automatically and the incandescent body begins to glow and to give light. To extinguish the lamp the tap 3 is turned off.

All the foregoing clearly shows that the automatic heating of the incandescent body of the lamp is attributable to the fact that the vaporizer is carried above the level of the petroleum in the fuel-container, and, consequently, to the possibility of turning on the tap 3 simultaneously with the ignition of the spirit in the cup so that the raw petroleum cannot overflow or escape and, merely as a consequence of the vaporizer becoming heated, the petroleum is gradually converted into gas, and begins to escape in that form through the hole in the nozzle and to penetrate into the mixing-chamber, where it is mixed with the air, the mixture then rising through the metallic network and being automatically ignited from the spirit-flame, whereupon the lamp commences to give light.

I declare that what I claim is:—

In an incandescent petroleum lamp, in which the petroleum is driven into the vaporizer by natural pressure, the combination of a supporting disk, a glass globe closely connected with and rising upward from said disk, a chimney located above said globe, a container freely communicating with the outside air and located above the supporting disk conveying petroleum to the vaporizer by the action of gravitation, a double vaporizer tube passing through said supporting disk and located inside said glass globe and chimney, a nozzle on said vaporizing tube discharging beneath said supporting disk and a mixing chamber closely connected with said supporting disk and adapted to admit all the air drawn in by the injection and the draft of the chimney from the space beneath the heated part of the lamp and beneath the glass globe in an opposite direction to the direction of the escaping gas, the discharge of the mixing chamber taking place above the air admission, substantially as described.

In testimony, that I claim the foregoing as my invention, I have signed my name in presence of two subscribing witnesses.

MATTHIAS MALKIEL.

Witnesses:
  P. ORJEKORSKY,
  BR. BIERNAERSI.